(12) United States Patent
Qiang et al.

(10) Patent No.: US 9,805,762 B2
(45) Date of Patent: *Oct. 31, 2017

(54) BAND REWRITE OPTIMIZATION

(71) Applicant: Seagate Technology LLC, Cupertino, CA (US)

(72) Inventors: Jian Qiang, Singapore (SG); Wen Xiang Xie, Singapore (SG); Libin Cai, Singapore (SG); Andrew Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,185

(22) Filed: Mar. 24, 2017

(65) Prior Publication Data

US 2017/0200469 A1    Jul. 13, 2017

Related U.S. Application Data

(63) Continuation of application No. 14/250,286, filed on Apr. 10, 2014, now Pat. No. 9,640,201.

(51) Int. Cl.
| | |
|---|---|
| *G11B 5/09* | (2006.01) |
| *G11B 20/12* | (2006.01) |
| *G11B 5/02* | (2006.01) |

(52) U.S. Cl.
CPC ............ *G11B 20/1217* (2013.01); *G11B 5/02* (2013.01); *G11B 2020/1232* (2013.01); *G11B 2020/1238* (2013.01)

(58) Field of Classification Search
CPC .. G11B 5/012; G11B 5/00; G11B 5/02; G11B 19/04; G11B 15/04; G11B 27/36; G11B 2220/20; G11B 27/3027; G11B 2220/90
USPC .......... 360/55, 60, 31, 48; 369/53.14, 53.15, 369/53.17; 714/8, 2, 42, 704
See application file for complete search history.

(56) References Cited

U.S. PATENT DOCUMENTS

| | | |
|---|---|---|
| 6,384,999 B1 | 5/2002 | Schibilla |
| 6,697,977 B2 | 2/2004 | Ozaki |
| 6,862,151 B2 | 3/2005 | Hoskins et al. |
| 6,868,477 B2 | 3/2005 | Hoskins et al. |
| 7,609,596 B2 | 10/2009 | Mori |
| 8,411,386 B2 | 4/2013 | Hongawa et al. |
| 2012/0300325 A1 | 11/2012 | Hall |
| 2013/0293977 A1 | 11/2013 | Tinker |

*Primary Examiner* — Nabil Hindi
(74) *Attorney, Agent, or Firm* — Holzer Patel Drennan

(57) ABSTRACT

Implementations disclosed herein provide a method comprising comparing high-latency data sectors of a storage band, the high-latency data sectors having latency above a predetermined threshold, with target sectors for storing new data to determine one or more of the high-latency data sectors that may be skipped during retrieval of at-rest data from the storage band.

20 Claims, 3 Drawing Sheets

BAND REWRITE OPTIMIZATION

PRIORITY CLAIM

The present application is a continuation application of U.S. patent application Ser. No. 14/250,286 filed Apr. 10, 2014, and titled "Band Rewrite Optimization", and expected to issue on May 2, 2017 as U.S. Pat. No. 9,640,201, which is hereby incorporated by reference in its entirety.

BACKGROUND

Disc drives are data storage devices that store digital data in magnetic form on a rotating storage medium called a disc. Each surface of a disc may be divided into several hundred thousand tracks arranged in tightly-packed concentric circles. Each track is further broken down into sectors that are arranged sequentially. That is, each sector on a track is adjacent to the previous and next sector. Generally, each of the surfaces in a disc drive has a recording head for reading and writing data to a sector with one head per surface of the disc. Data is accessed by moving the heads from the inner to outer part (and vice versa) of the disc drive by an actuator assembly. During a data access operation, one of the heads is positioned over the desired location of a sector on the disc in order to access (i.e., read or write) the sector.

SUMMARY

Implementations disclosed herein provide a method comprising comparing high-latency data sectors of a storage band, the high-latency data sectors having latency above a predetermined threshold, with target sectors for storing new data to determine one or more of the high-latency data sectors that may be skipped during retrieval of at-rest data from the storage band.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

BRIEF DESCRIPTIONS OF THE DRAWINGS

DETAILED DESCRIPTION

Figure 1:
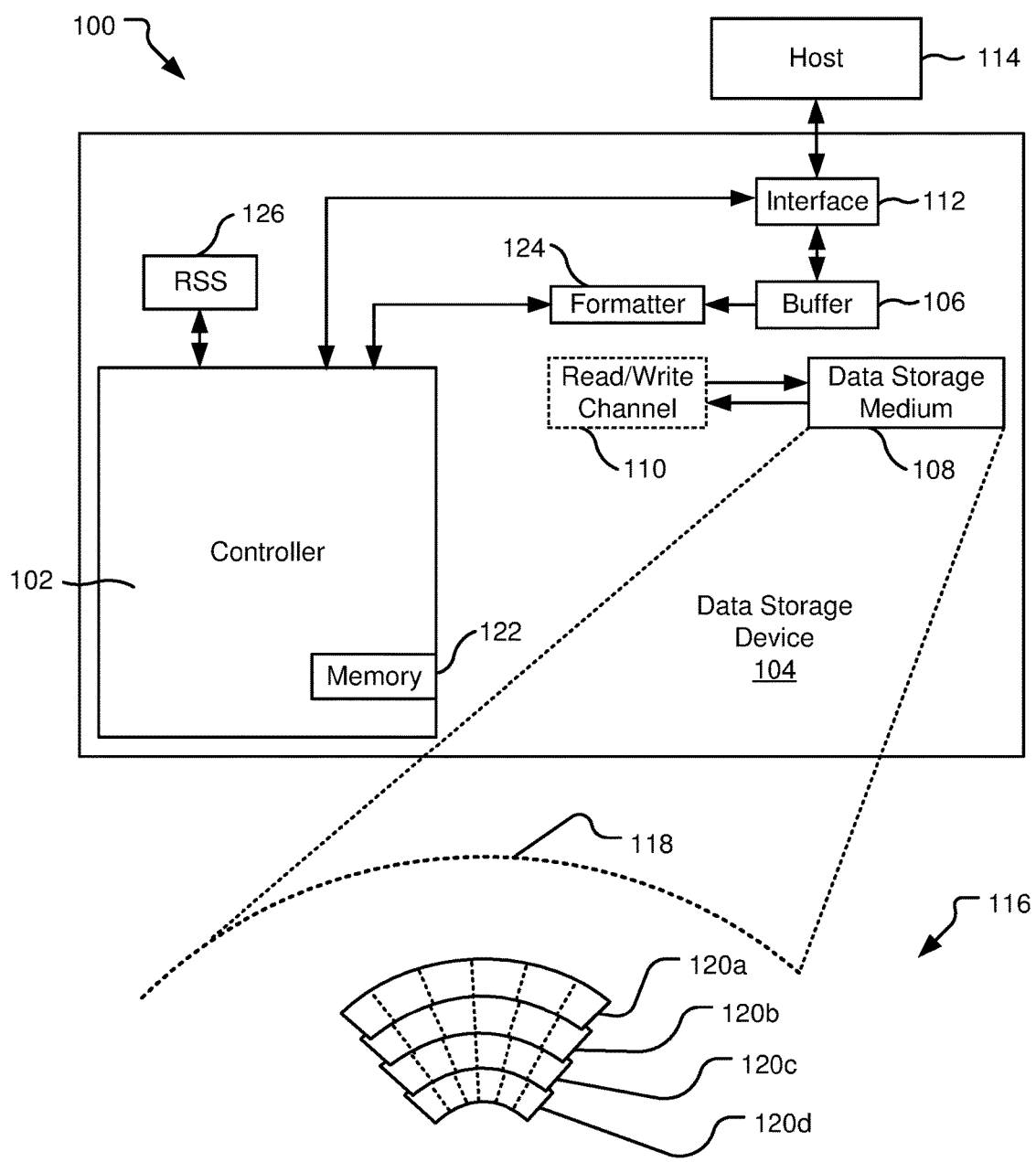
FIG. 1 illustrates a block diagram of an example data storage device system.

Latency is an important storage device performance measurement. A common definition of latency measures the time that the device (in this case a disc drive) must wait for the correct sector to come around to pass under the appropriate head. At the time the appropriate head arrives at and begins to follow the desired track, the actual sector may have been remapped such that the data for the read or the write operation may have been relocated elsewhere on the storage medium. In other words, the data at the actual sector may be invalid and the valid data may be at the remapped location, requiring actuator movement to the other location, and back again. This causes a latency since the servo system must wait for the correct sector to arrive under a head.

Reducing delays can result in significant performance improvement in a computing system because more total work can be accomplished by the system in the same unit of time as before. Invariably, a disc may contain defective or bad sectors (e.g., manufacturing imperfections may render a sector inoperable). These may show up as errors when attempting to read the sector.

In some implementations, when defective sectors are discovered in the data storage area of a disc drive, one or more of the block addresses corresponding to the defective sectors are mapped to good spare sectors in another part of the data storage area, thus increasing reliability. For this mapping purpose, spare sectors are reserved in a disc drive as substitutes for those defective sectors. A disc drive controller keeps track of the defective sectors in the disc drive and automatically substitutes one or more of the defective sectors with a spare sector. When a host controller sends a command to read data from or write data to a defective sector, the disc drive controller seeks to the designated spare sector taken from the pool of spare sectors rather than seeking to the defective sector. This technique is known as sparing (or defect mapping) and causes defective sectors to be transparent to a user.

Moreover, in most cases, mapping a defective sector to a spare sector causes fragmentation or physical discontinuity of data. Once data is fragmented, each fragment of data introduces a latency to locate the beginning sector of each fragment and, if the next fragment starts on a different track, an additional seek time delay is introduced. Thus, there can be a big performance difference between accessing data that is laid out contiguously on a disc and accessing data that is fragmented or physically discontinuous into a number of pieces. In any case, greater seek time and/or latency causes slower access times and lower throughput to the data stored in a disc drive.

The technology disclosed herein includes a method for skipping reading data from known defective sectors, when it is not necessary to read such data, in order to reduce redundant disc revolutions during a band updating process. Such skipping operation also reduces retries and seeks, thereby optimizing the band updating process. It also improves hardware lifespan, reduces noise by reducing the movement of mechanical parts, improves user experience, reduces power consumption, prevents permanent drive degradation, and improves a drive's overall performance.

Implementations of the technology disclosed herein may be employed in the context of a shingled magnetic recording (SMR) drive, although other applications may also be contemplated. While the implementations disclosed herein are described in terms of updating bands of data on SMR media devices, similar technology can also be applied to updating of units of data for non-SMR devices, such as for example, sectors of data, etc. Furthermore, different SMR architectures may be used, including statically-mapped write-in-place SMR, dynamically-mapped write-forward SMR, etc.

Many end users of storage devices expect command response time to have a low sigma (average variance). The command response time is associated with the work that a drive has to perform and errors that create more work can result in unpredictable command times, and overall performance, for a device. The disclosed technology decreases command response time variance and total time in the presence of high latency defective or problematic sectors by providing an algorithm resulting in higher efficiency and more predictable performance.

In various implementations of SMR drives, data is grouped into isolated storage bands. Each of the storage bands contains a group of shingled tracks located in the main store of the drive. High-latency data sectors in the shingled tracks of storage bands may include unallocated (e.g., unwritten, unmapped) and/or reallocated sectors, which may interrupt data transfer and impact the throughput of a disc drive. For an SMR drive with static logical block address (LBA) to physical block address (PBA) mapping, user data update may be achieved through a band update process. For example, an SMR update process, such as one used for a band rewrite operation (BRO), may be used to update a band(s). A BRO generally involves updating a band with a large fraction of sectors that have no new data, the addresses of which do not need to be accessed in any way.

The BRO or Write Forward update process may include a read step, wherein data is read from a band and stored into a memory such as DRAM. Subsequently, during a modify step, new data is inserted into the data stored in the DRAM. A write step follows next, which involves writing the combined data from the DRAM to an intermediate location on the disk (for Static Map only). The last necessary write step occurs to a final resting place in a main store on the disk wherein the data from the media scratch pad is written to the SMR band (either in-place or to an available band). There may be numerous revolutions required for the average SMR update process to update data on a band of SMR media. Each of such revolutions may encounter errors in reading data, writing data, etc. It is desirable to speed up the SMR update process and reduce variance, particularly in the presence of errors or other latency-inducing factors (low system resources, vibration and shock, etc.).

If errors occur in a read step (e.g., bad servo information that requires several revolutions to read data) for sectors that need to be updated, the disclosed technology skips reading the data from these sectors. During this process, it may be safe to skip over known high-latency sectors as long as the known high-latency sectors do not require update, rather than try to transfer every sector, unnecessarily. For example, in several implementations, a number of blocks are in a sector and the host/user can write single blocks, which may cause a sector to need updating (and hence, a read). In other implementations, when the size of a sector equals the size of a block, or when a whole sector's worth of blocks is overwritten by the host, the sector does not require update. As a result, the SMR update process is optimized by reducing the number of retries on data that does not need to be obtained. In effect, the disclosed technology ensures that expensive error recovery during an SMR update process is only performed when necessary.

In order to skip over sectors that cause read errors, it is necessary for the controller to know where these sectors are located. In some embodiments, the location of these sectors may or may not be known by the controller, and that information must be "unhidden". A request may be made to a recording subsystem (RSS) located on a storage device. The RSS is responsible for managing the location of sectors that are high latency sectors, when a read operation to the sector may encounter an error, and information regarding those sectors and the related errors (e.g., what kind of errors they are). An interface layer within a storage device (where certain operations such as band image construction, handling commands, caching, etc. occurs) may interact with other layers, entities, and objects in the software system to get information owned and managed by such entities, (e.g., from RSS regarding where errors are physically located, and logically remapped to on the storage medium).

Furthermore, it may also be desirable to know what sectors do not have to be read and whether and what errors (e.g., retries or defects) exist on those sectors and then avoid those errors. For example, on a retry, reading data on a bad sector should not be performed if it is known that the data from such sector is stored in a spare sector. In this case, seeking to a spare sector should be performed to reduce the revolutions required by retrying the reading data on a bad sector, prior to the inevitability of seeking to the spare area.

In another embodiment, device hardware limitations may require that sectors designated for retry be known. The operation for skipping used in the disclosed technology may be implemented using a skip mask, a method which allows the hardware to automatically know which sectors to skip, and which sectors to retry, when reading data. The controller queries for bad sectors via a request to the RSS. After receiving a response, the interface initializes and initiates a skip mask operation. The interface can provide information regarding the maximum skip distance and the number of skips. Once it is determined that certain areas do not have to be read, the configuration for the upcoming band update operation is known, and can be initiated.

FIG. 1 illustrates a diagram of an example data storage device system 100, showing the main functional circuits used on a data storage device 104 (e.g., an SMR HDD, an SMR SSHD, an object storage device, etc.) to control the operation of the data storage device 104. The system 100 includes a host device 114 (e.g., a computer, a mobile device, the internet, etc.) operably connected to the data storage device 104 communicating with each other. The data storage device 104 includes a disc drive controller 102. Control communication paths are provided between a host device 114 and the disc drive controller 102. The disc drive controller 102 provides communication and control for the data storage device 104 in conjunction with programming for the disc drive controller 102 stored in controller memory 122 (e.g., RAM, ROM, etc.). For example, the controller 102 can query for bad sectors via a request to the RSS 126. Data is transferred between the host device 114 and the data storage device 104 by way of a disc drive interface 112, a buffer 106, and a formatter 124.

A buffer 106 is used to facilitate high-speed data transfer between the host device 114 and the data storage device 104. Data to be written to a data storage medium 108 (e.g., a disc) is passed from the host device 114 to the interface 112 through the buffer 106, then further through the formatter 124, and then to the read/write channel 110, which encodes and serializes the data and provides the requisite write current signals to the heads (not shown). To retrieve data that has been previously stored by the data storage device 104, read signals are generated by the heads and provided to the read/write channel 110, which performs decoding and outputs the retrieved data through the formatter 124 and buffer 106, to the interface 112 for subsequent transfer to the host device 114.

The exploded view 116 shows a disc 118 of the data storage medium 108. A set of tracks 120a-120d are "shingled" over one another (shown in an expanded view). In one implementation, when the drive's read/write channel 110 receives requests to transfer segmented data on a few consecutive tracks, it will activate a skip mask operation, which controls the drive's hardware to skip over the sectors that do not require update.

Figure 2:
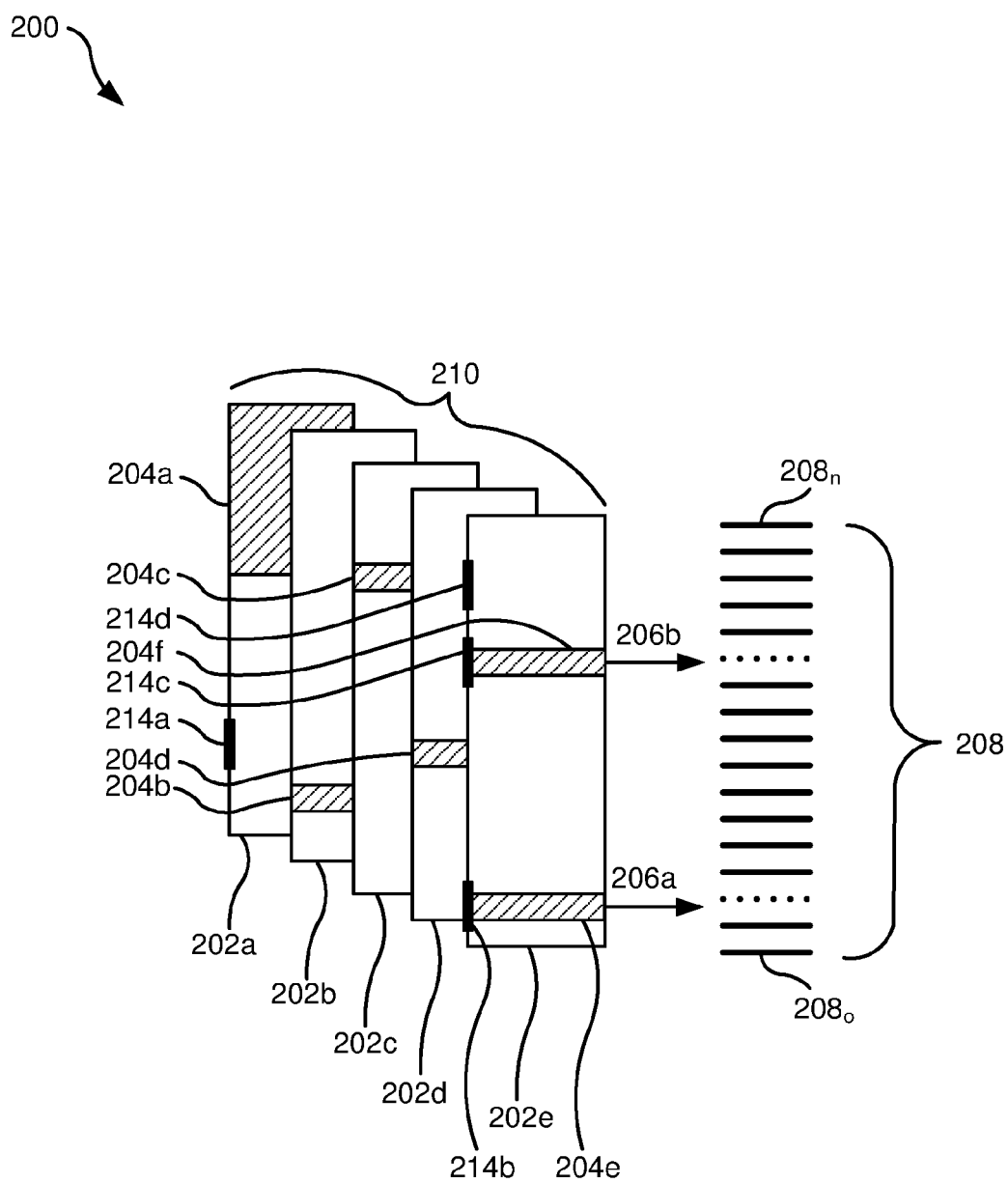
FIG. 2 illustrates example skip mask transfers on shingled tracks.

FIG. 2 illustrates example skip mask transfer 200 on shingled tracks of a band 210. Five shingled tracks 202a-202e on the band 210 are shown. The shingled tracks 202a-202e are shown logically unwrapped, and offset by the needed single track seek latency, or skew. One of the shingled tracks 202 may be a Fat Track (e.g., Fat Track 202e), which may be adjoining a guard track (not shown). However, functionally there is no difference with the Fat Track 202e and the other tracks 202a-202d for purposes of this disclosure. Each of the tracks 202a-202e may be further divided into a number of sectors. Furthermore, the tracks 202a-202e may be mapped to a series of LBAs, where in one implementation, such mapping may be sequential.

Information regarding a bad sector(s) and reallocated sectors 204a-204f may be compiled in defect tables (or other data structures) in an RSS module, domain, or entity (not shown). One or more of the bad sectors 204a-204f that are unpredictably bad sectors, may or may not have to undergo retry while performing a read or write operation thereto. It may not necessarily be known, nor is it necessary to know, what is wrong with a sector, except that additional work had to be performed to read from or write to that sector in the past. The RSS also compiles information in tables (or lists) regarding defective sectors where the data from such defective sectors is reallocated to spare sectors. The RSS also may own the mapping and management of such reallocated bad sectors to the spare sectors.

A band update request from a host for updating data to the band 210 may provide new data 214a-214d for some sectors of the band 210. Initially, information from a bad sector(s) 204a-204f in the RSS is compared with information in the new data 214a-214d in a band update request. If part of the new data 214a-214d overlaps a particular area of the bad sectors 204a-204f, then a read does not have to be performed to that particular bad sector. For example, the new data 214b is directed to sectors that overlap the bad sector 204e, denoted by the overlap area 206a. In this case, the data from the bad sector 204e does not need to be read as it is going to be replaced anyway. Therefore, that overlapped area 206a is skipped during a BRO operation. In another case, there may be no overlap of new data and neither read nor write is required because shingled writing cannot change the status of the known bad sectors. In yet another case, there may be partial overlap and both read and write are required.

Figure 3:
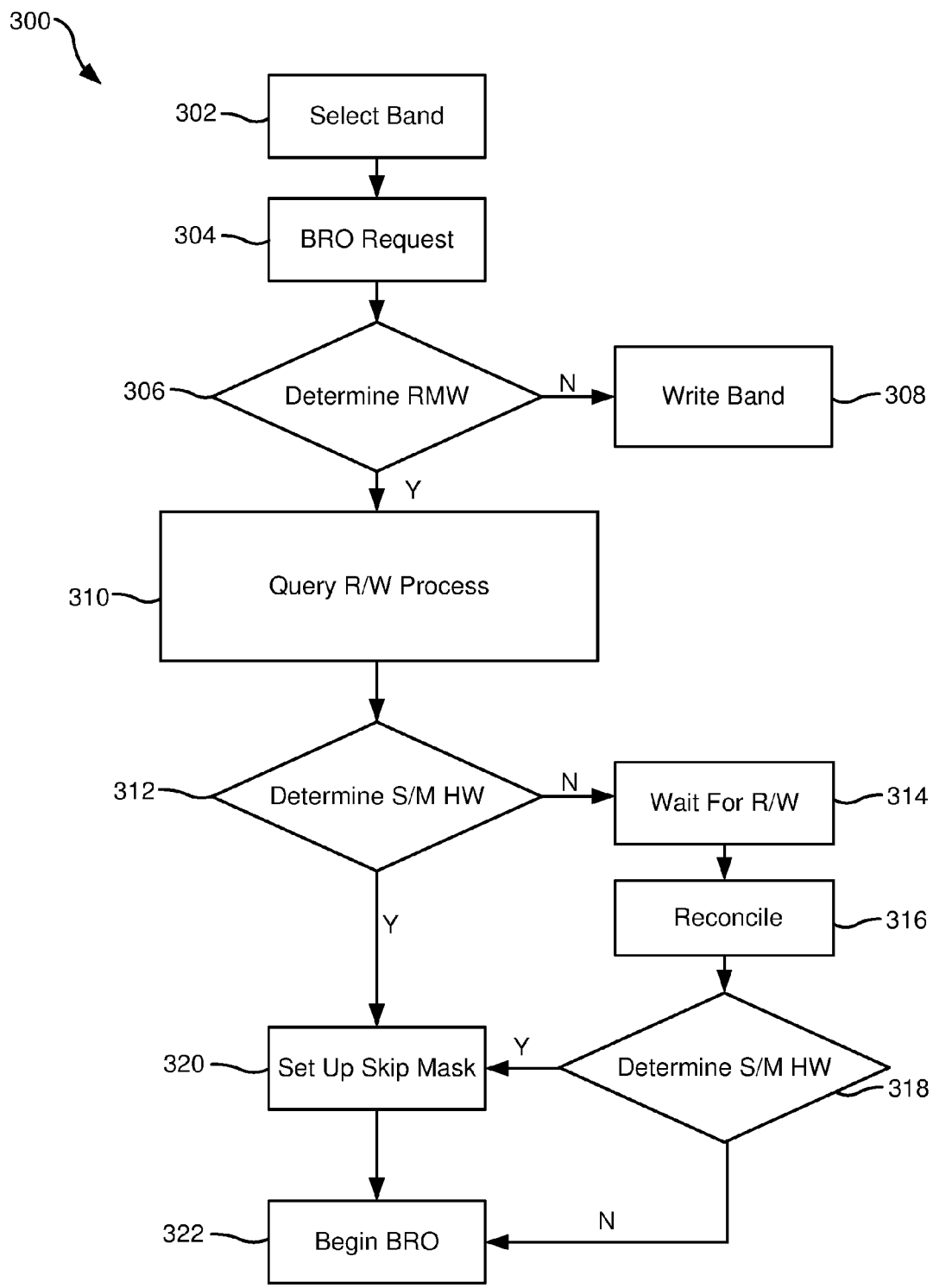
FIG. 3 illustrates a flowchart of example operations for determining high-latency sectors that may be skipped.

One way for the controller to instruct the disc drive to skip reading a particular sector, in cases of overlap or no overlap with new data, is by providing a skip mask 208. FIG. 2 illustrates a skip mask 208 with a number of toggle states, $208_o$-$208_n$, where each of the toggle states $208_0$-$208_n$ corresponds to a track of a band. In the illustrated implementation, a toggle state 208a, which corresponds to the sector 206a is set to a 0 value, indicating to the disc drive that sector 206a is not to be read. A skip mask process uses the skip mask 208 when performing a read operation on a band such that bad sectors 206a, 206b are skipped. In one implementation, a skip mask may be provided for each band. In FIG. 3, one skip mask process is shown that uses the skip mask 208.

Referring now to FIG. 3, example operations 300 for determining one or more high-latency data sectors that may be skipped during retrieval are shown. This occurs during retrieval of at-rest data from the storage band by comparing high-latency data sectors of a storage band. First, a band is selected to be updated (e.g., for a BRO) in a band selection operation 302. A BRO request is made in a request operation 304. Upon this request, an operation 306 determines if a read-modify-write (RMW) operation is required. If no RMW operation is required, an operation 308 simply writes the data to the selected band. However, if an RMW operation is required, a query operation 310 sends a query to a read/write process to determine if any of the target sectors of the RMW operation are bad sectors and/or reallocated sectors.

Next, it is determined whether skip mask hardware can support a full band update map (i.e., a configuration of discontinuities). This determination is performed in a skip mask hardware determination operation 312. If the skip mask hardware can support a full band update, then an operation 320 sets up skip mask for the full band and subsequently a BRO operation begins at operation 322. However, if the skip mask hardware cannot support a full band update map, then a waiting operation 314 takes place, wherein the process 300 waits for the read/write process to provide information about the bad sectors and/or reallocated sectors.

Then, the bad sectors and/or the reallocated sectors are reconciled with the band update map to set the skip trace to skip high-latency areas, as necessary, in a reconciliation operation 316. Another determination operation 318 determines whether a skip mask operation can support an abbreviated update map as set up in hardware determination operation 316. If it cannot support an abbreviated update map, a skip mask operation will not take place; then BRO begins in the BRO operation 322; however, this process will not be optimized. However, if the operation 318 determines that the skip mask hardware can support an abbreviated skip mask update map, the operation 320 sets up the skip mask using the abbreviated skip mask update map. After the skip mask operation is set up, then BRO commences in a BRO operation 322 and this process will be optimized.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
    comparing high-latency data sectors of a storage band with target sectors to determine one or more of the high-latency data sectors that may be skipped during retrieval of at-rest data from the storage band.

2. The method of claim 1, wherein comparing high-latency data sectors of a storage band is activated in response to a band update request.

3. The method of claim 1, wherein the high-latency data sectors of the storage band are known sectors skipped during read operations.

4. The method of claim 1, wherein comparing high-latency data sectors occurs in a shingled magnetic recording device.

5. The method of claim 1, wherein the target sectors are for storing new data.

6. The method of claim 1, further comprising:
    selecting a band for data update; and
    determining if a read-modify-write operation is required.

7. The method of claim 6, further comprising:
    determining if a skip mask operation hardware cannot support a full band update map;
    setting up a skip mask operation; and
    performing a band rewrite optimization process using the skip mask operation.

8. The method of claim 1, further comprising setting up a skip mask operation to skip one or more high-latency data sectors.

9. The method of claim 8, further comprising performing a band rewrite operation using the skip mask operation.

10. The method of claim 1, wherein comparing high-latency data sectors of a storage band is activated in response to a write request to transfer data.

11. The method of claim 10, further comprising determining whether a skip mask operation can support a full band update map.

12. The method of claim 11, further comprising reconciling defective sectors and/or reallocated sectors with the full band update map.

13. The method of claim 12, further comprising determining whether the skip mask operation can support an abbreviated band update map.

14. The method of claim 13, further comprising setting up an abbreviated skip mask operation if the skip mask operation can support an abbreviated band update map.

15. An apparatus, comprising:
    a host configured to send a read request to a storage device; and
    the storage device configured to compare high-latency data sectors of a storage band with target sectors to determine one or more of the high-latency data sectors that may be skipped during retrieval of at-rest data from the storage band.

16. The apparatus of claim 15, wherein the apparatus is a shingled magnetic recording device.

17. One or more non-transitory computer-readable storage media encoding computer-executable instructions for executing on a computer system a computer process that compares high-latency data sectors of a storage band, the computer process comprising:
    comparing high-latency data sectors of a storage band with target sectors for storing new data; and
    determining one or more of the high-latency data sectors that may be skipped during retrieval of at-rest data from the storage band.

18. The one or more non-transitory computer-readable storage media of claim 17, further comprising setting up a skip mask operation to skip one or more high-latency data sectors that may be skipped.

19. The one or more non-transitory computer-readable storage media of claim 17, further comprising performing a band rewrite optimization operation.

20. The one or more non-transitory computer-readable storage media of claim 17, wherein comparing high-latency data sectors of a storage band is activated in response to a write request to transfer data and further comprising:
    determining whether a skip mask operation can support a full band update map;
    reconciling defective sectors and/or reallocated sectors with the full band update map;
    determining whether the skip mask operation can support an abbreviated band update map; and
    setting up an abbreviated skip mask operation if the skip mask operation can support an abbreviated band update map.

* * * * *